United States Patent
Chen et al.

(10) Patent No.: US 12,480,805 B2
(45) Date of Patent: Nov. 25, 2025

(54) WEIGHING DEVICE WITH TEMPERATURE SENSING FUNCTION AND TEMPERATURE COMPENSATION METHOD THEREOF

(71) Applicant: WISTRON CORP., New Taipei (TW)

(72) Inventors: Chun-Ting Chen, New Taipei (TW); Chun-Wei Fang, New Taipei (TW); Tun-Kai Liang, New Taipei (TW); Kung-Chih Huang, New Taipei (TW)

(73) Assignee: WISTRON CORP., New Taipei (TW)

( * ) Notice: Subject to any disclaimer, the term of this patent is extended or adjusted under 35 U.S.C. 154(b) by 323 days.

(21) Appl. No.: 18/321,849

(22) Filed: May 23, 2023

(65) Prior Publication Data

US 2024/0263993 A1   Aug. 8, 2024

(30) Foreign Application Priority Data

Feb. 3, 2023   (TW) .................................. 112103777

(51) Int. Cl.
*G01G 23/48* (2006.01)
*G01G 23/01* (2006.01)
*G01K 15/00* (2006.01)

(52) U.S. Cl.
CPC ............. *G01G 23/48* (2013.01); *G01G 23/01* (2013.01); *G01K 15/005* (2013.01)

(58) Field of Classification Search
CPC .......... G01G 23/01; G01G 23/48; G01K 1/20; G01K 15/005
See application file for complete search history.

(56) References Cited

U.S. PATENT DOCUMENTS

2021/0215552 A1 * 7/2021 Tseng ...................... G01K 7/427
2024/0344902 A1 * 10/2024 Wang ....................... G01K 3/10

FOREIGN PATENT DOCUMENTS

CN    110956338 A   *  4/2020   ............. G06Q 10/04
WO    2023005788 A1    2/2023

OTHER PUBLICATIONS

TW Office Action dated Jan. 29, 2024 in Taiwan application No. 112103777.

* cited by examiner

*Primary Examiner* — Natalie Huls
(74) *Attorney, Agent, or Firm* — McClure, Qualey & Rodack, LLP

(57) ABSTRACT

A temperature compensation method for a weighing device, wherein the scale is provided with a temperature sensor, the method is performed by a processor, and includes, when the scale is powered on: receiving a first ambient temperature from the temperature sensor at a first time point; receiving a second ambient temperature from the temperature sensor at a second time point; obtaining a first compensation value associated to a default temperature threshold and a relationship between the first ambient temperature and the second ambient temperature, and obtaining a cumulative compensation value updated by the default temperature threshold; and obtaining a calibrated target temperature that is a target temperature of a subject sensed by the temperature sensor being calibrated by the cumulative compensation value, wherein the first time point is earlier than the second time point. The present disclosure also provides a weighing device with temperature sensing function.

20 Claims, 9 Drawing Sheets

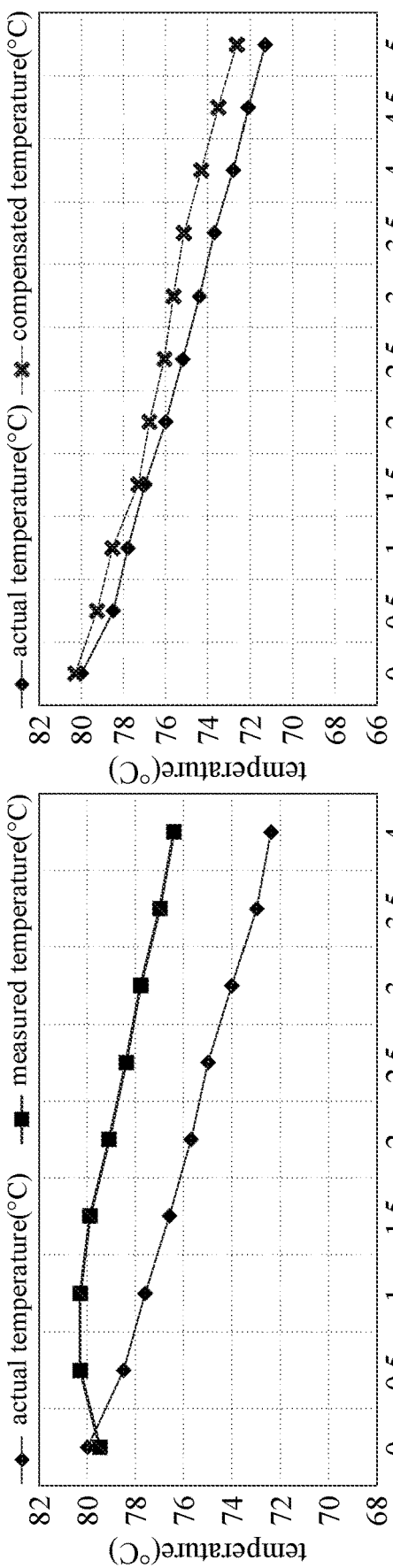
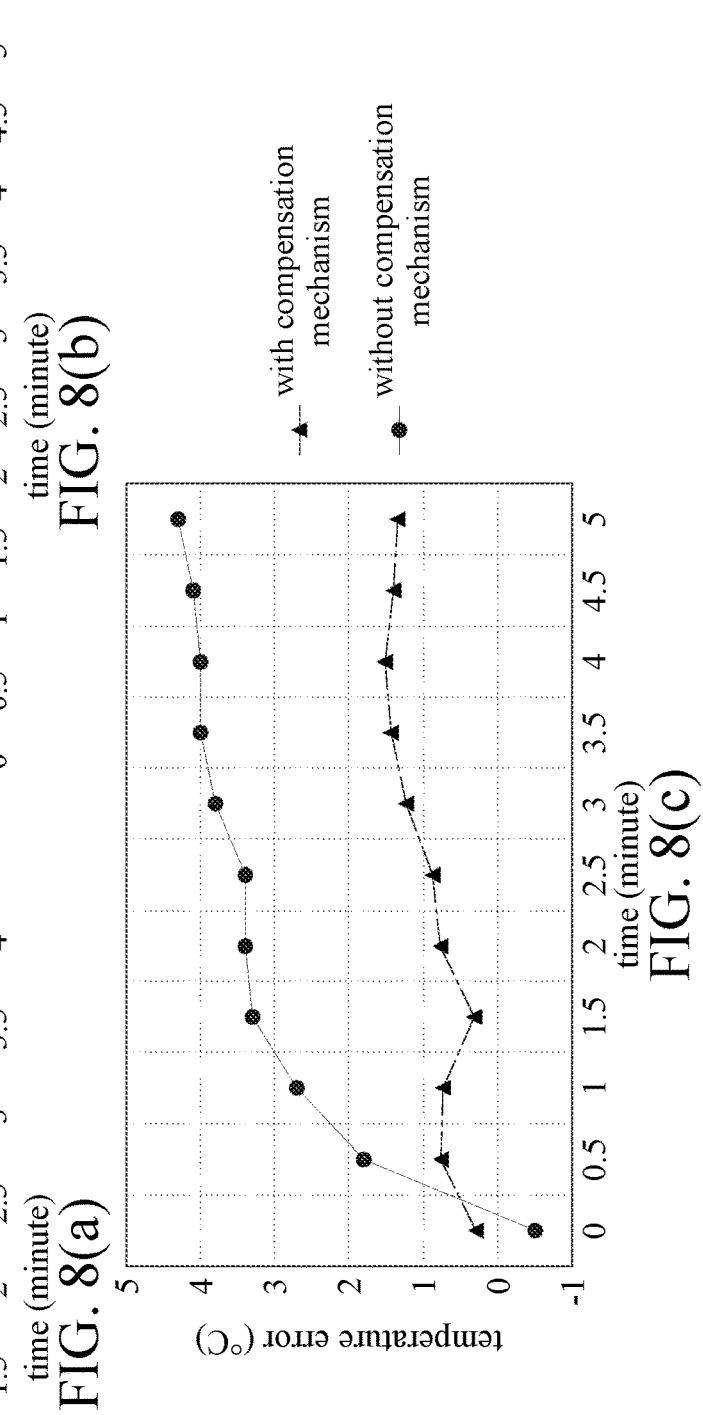
FIG. 8(a)
FIG. 8(b)
FIG. 8(c)

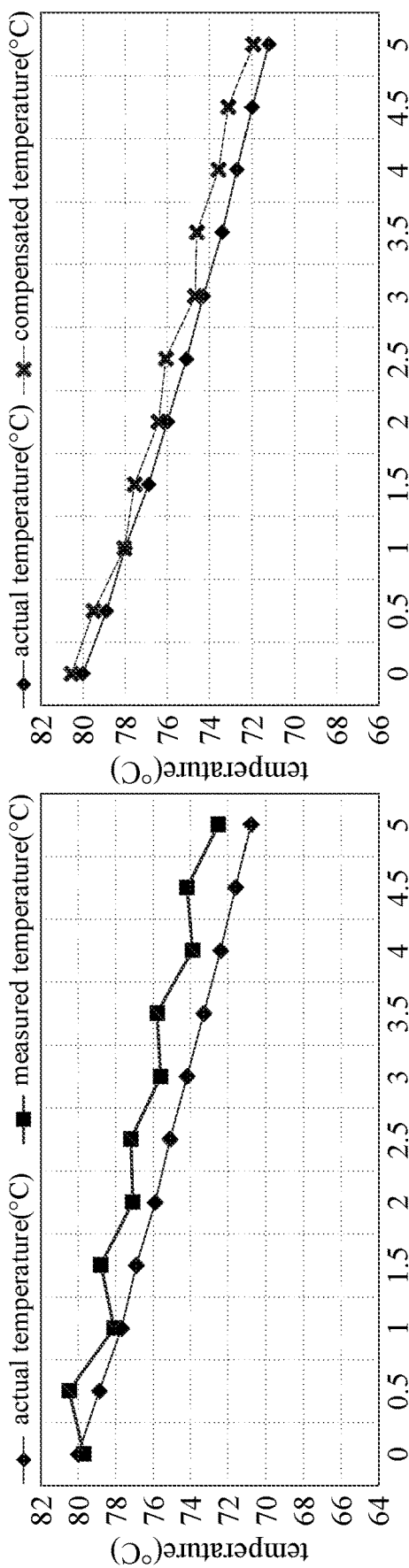
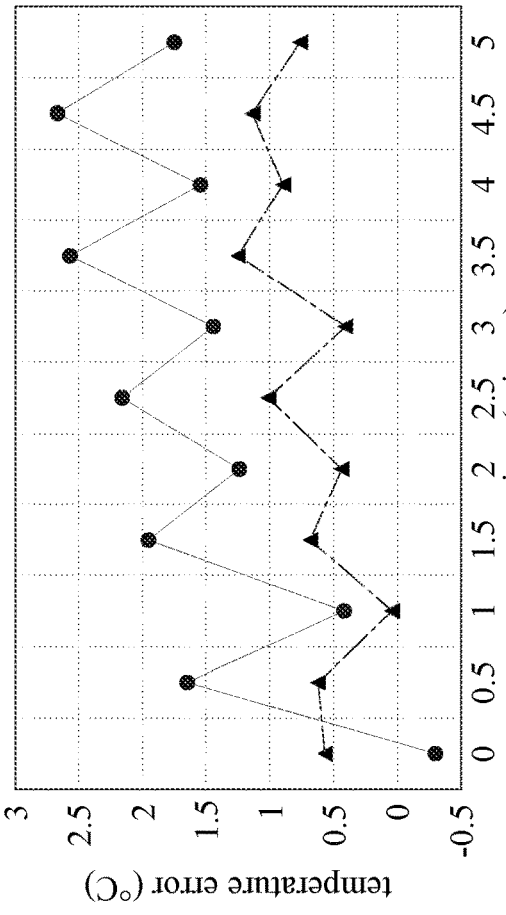
FIG. 9(a)
FIG. 9(b)
FIG. 9(c)

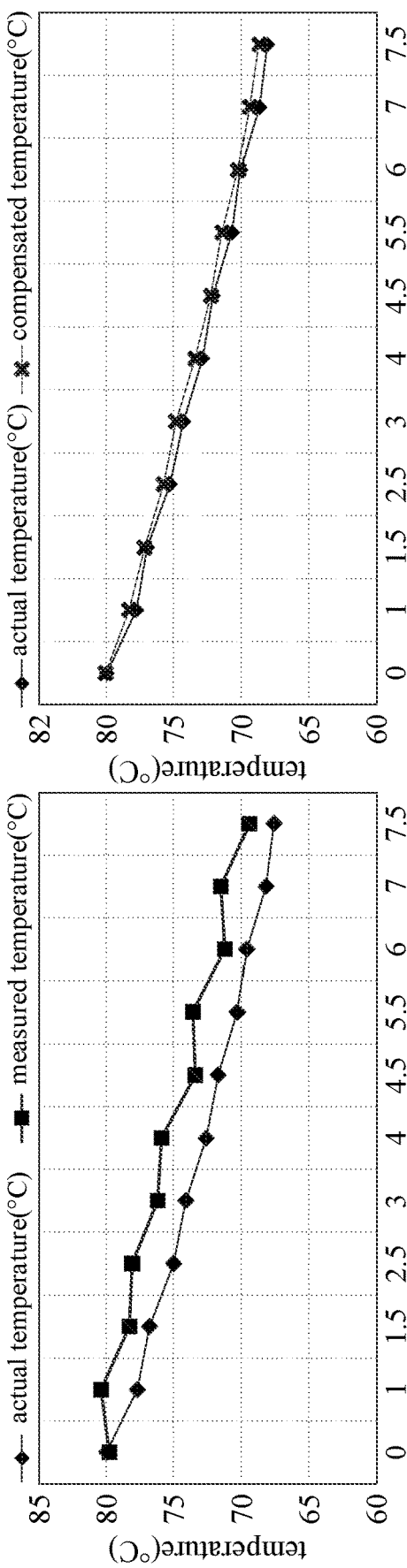
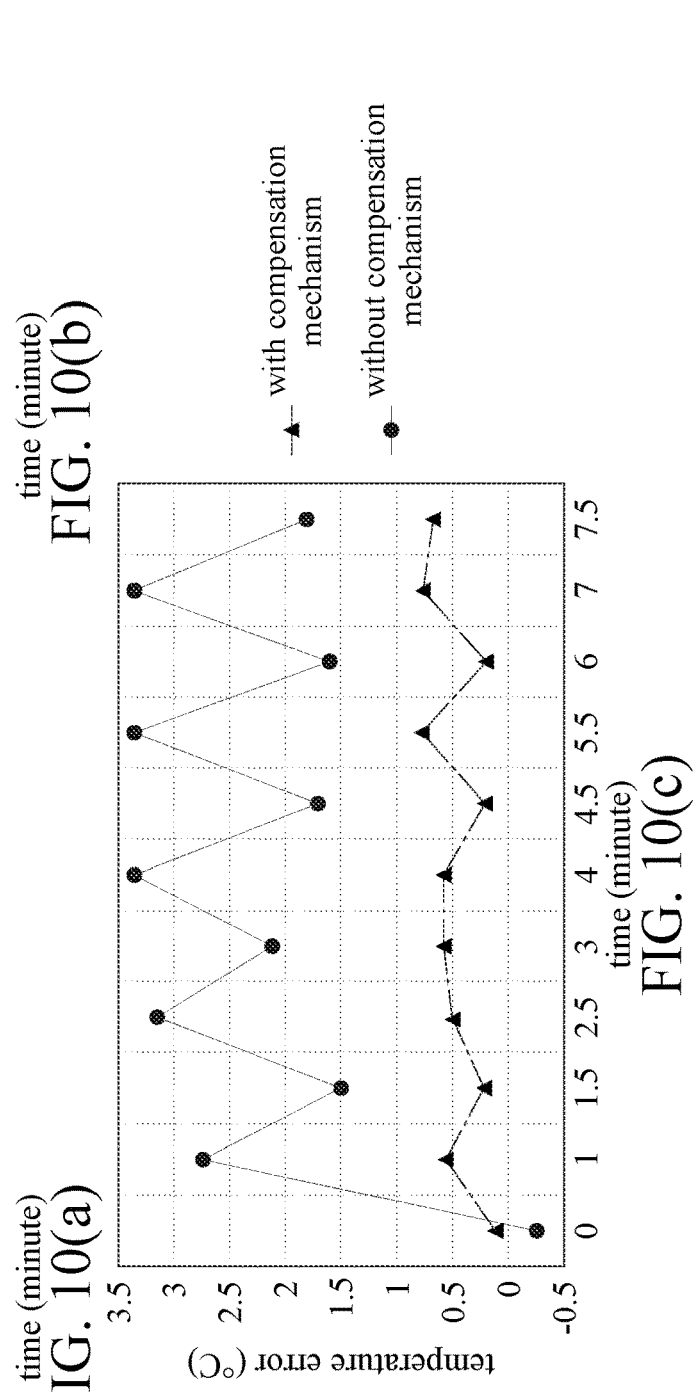
FIG. 10(a)
FIG. 10(b)
FIG. 10(c)

WEIGHING DEVICE WITH TEMPERATURE SENSING FUNCTION AND TEMPERATURE COMPENSATION METHOD THEREOF

CROSS-REFERENCE TO RELATED APPLICATIONS

This non-provisional application claims priority under 35 U.S.C. § 119(a) on Patent Application No(s). 112103777 filed in Republic of China (ROC) on Feb. 3, 2023, the entire contents of which are hereby incorporated by reference.

BACKGROUND

1. Technical Field

This disclosure relates to a weighing device with temperature sensing function and temperature compensation method thereof.

2. Related Art

Currently, in addition to general electronic scales on the market, there are also electronic scales combined with temperature sensors, allowing users to simultaneously determine the weight and temperature of the subject to be measured, which improves the usage convenience. However, the temperature sensor is located at the bottom of the scale surface of the electronic scale. When an object with a high or low temperature is placed on the scale surface for a long time (for example, 1 minute), the scale surface is likely to absorb or release heat, thereby affecting the measurement accuracy of the temperature sensor, and causing the temperature reading to be higher or lower than the actual temperature.

SUMMARY

According to one or more embodiment of this disclosure, a temperature compensation method for a weighing device is provided, wherein the scale is provided with a temperature sensor, and the method is performed by a processor and includes, when the scale is powered on: receiving a first ambient temperature from the temperature sensor at a first time point; receiving a second ambient temperature from the temperature sensor at a second time point; obtaining a first compensation value associated to a default temperature threshold and a relationship between the first ambient temperature and the second ambient temperature, and obtaining a cumulative compensation value updated by the default temperature threshold; and obtaining a calibrated target temperature that is a target temperature of a subject sensed by the temperature sensor being calibrated by the cumulative compensation value; wherein the first time point is earlier than the second time point.

According to one or more embodiment of this disclosure, a weighing device with temperature sensing function includes: a scale, a temperature sensor and a processor. The scale has a weighing surface, and a subject is carried by the scale selectively. The temperature sensor is positioned on the weighing surface of the scale or positioned within the scale and located at a surrounding of a position, and the subject is sensed by the temperature sensor selectively. The processor is connected to the scale and the temperature sensor, wherein when the scale is powered on, the processor is configured to perform: receiving a first ambient temperature from the temperature sensor at a first time point; receiving a second ambient temperature from the temperature sensor at a second time point; obtaining a first compensation value associated to a default temperature threshold and a relationship between the first ambient temperature and the second ambient temperature, and obtaining a cumulative compensation value updated by the default temperature threshold; and obtaining a calibrated target temperature that is a target temperature of a subject sensed by the temperature sensor being calibrated by the cumulative compensation value; wherein the first time point is earlier than the second time point.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 8(a) is a graph showing the change of actual temperature and measured temperature without compensation mechanism in the first scenario; FIG. 8(b) is a graph showing the change of actual temperature and the compensated water temperature (the calibrated target temperature) using the temperature compensation method of the present disclosure in the first scenario; FIG. 8(c) is a comparison graph showing the errors of FIG. 8(a) and FIG. 8(b);

FIG. 9(a) is a graph showing the change of actual temperature and measured temperature without compensation mechanism in the second scenario; FIG. 9(b) is a graph showing the change of actual temperature and the compensated water temperature (the calibrated target temperature) using the temperature compensation method of the present disclosure in the second scenario; FIG. 9(c) is a comparison graph showing the errors of FIG. 9(a) and FIG. 9(b); and FIG. 10(a) is a graph showing the change of actual temperature and measured temperature without compensation mechanism in the third scenario; FIG. 10(b) is a graph showing the change of actual temperature and the compensated water temperature (the calibrated target temperature) using the temperature compensation method of the present disclosure in the third scenario; FIG. 10(c) is a comparison graph showing the errors of FIG. 10(a) and FIG. 10(b).

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1A:
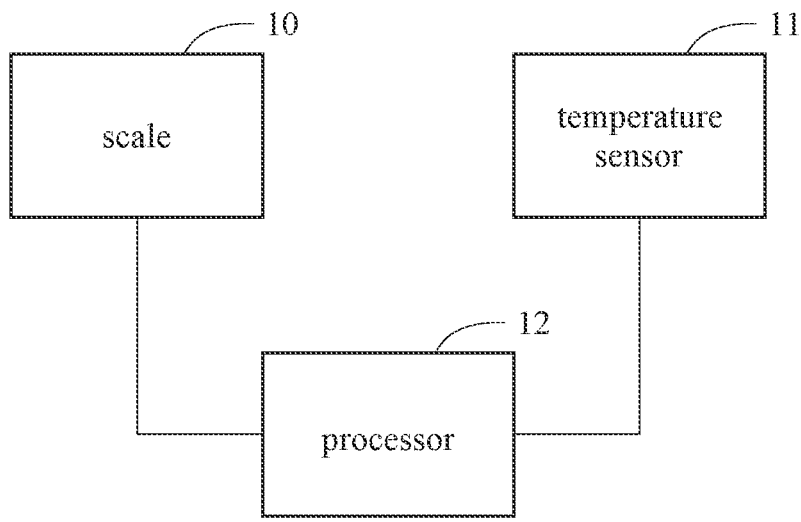
FIG. 1(a) is a block diagram illustrating a weighing device with temperature sensing function according to an embodiment of the present disclosure.
Figure 1B:
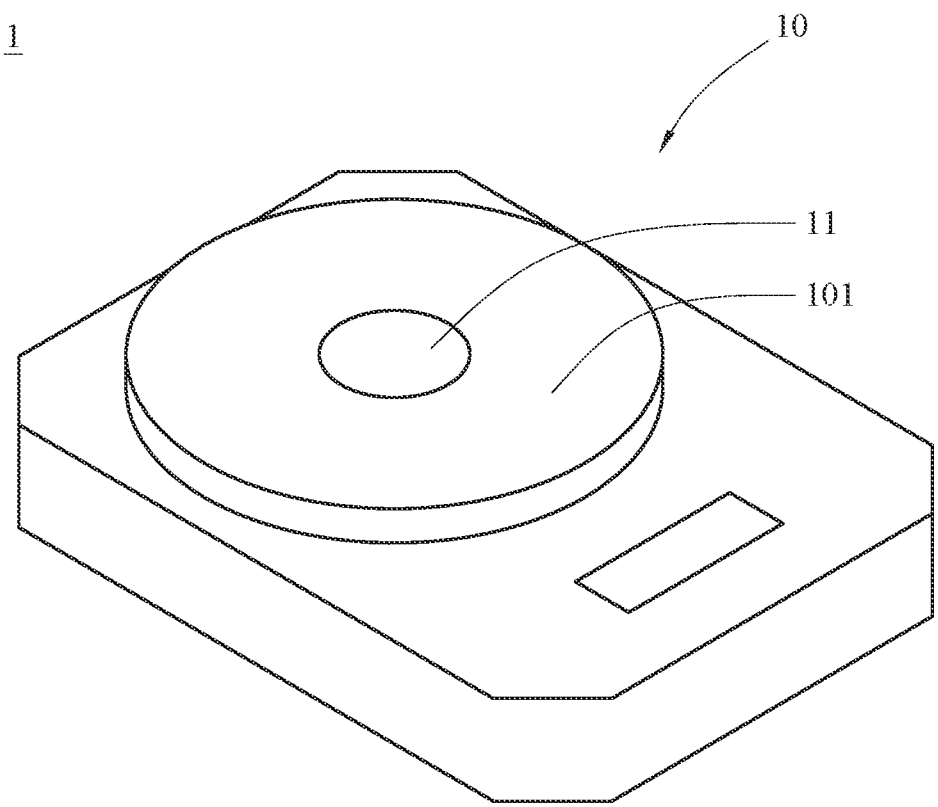
FIG. 1(b) is a schematic diagram illustrating a weighing device with temperature sensing function according to an embodiment of the present disclosure.

Please refer to FIG. 1(a) and FIG. 1(b), wherein FIG. 1(a) is a block diagram illustrating a weighing device with temperature sensing function according to an embodiment of the present disclosure; FIG. 1(b) is a schematic diagram illustrating a weighing device with temperature sensing function according to an embodiment of the present disclosure. The weighing device 1 includes a scale 10, a temperature sensor 11 and a processor 12. The processor 12 may be connected to the scale 10 and the temperature sensor 11 in a wired or wireless way.

The scale 10 is, for example, an electronic scale or any other component with weighing function. The weighing device 10 includes a weighing surface 101 for selectively carrying a subject, and the weighing device 10 may be used to measure the weight of the subject. The subject may be liquid or solid object loaded in a container. The container is, for example, a paper-made container, a glass container, a ceramic container, a plastic container and a metal container etc.; the subject may be food, such as dessert, meat etc., the present disclosure does not limit the type of the subject and the container. Any container made of thermally conductive material may be adapted to the weighing device and temperature compensation method thereof of the present disclosure.

The temperature sensor 11 may be an infrared sensor (IR sensor), is positioned on the weighing surface 101 of the scale 10 or positioned within the scale 10, and is located at the surrounding of a position, wherein the position is the position of the subject. For example, the subject is disposed on the weighing surface 101, and the temperature sensor 11 may be disposed at the weighing surface 101 or underneath the weighing surface 101. Further, when the temperature sensor 11 is disposed underneath the weighing surface 101, a portion of the weighing surface 101 is reserved for the penetration of infrared emitted by the temperature sensor 11. For example, said portion may be made of germanium glass. The temperature sensor 11 may be used to sense the temperature of the surrounding environment and the temperature of the subject (referred to as "target temperature" hereinbelow) selectively. Specifically, in the embodiment of the temperature sensor 11 being the IR sensor, the temperature sensor 11 adds the temperature of itself to a temperature difference between said temperature of itself and the subject to obtain the target temperature, wherein the temperature of the temperature sensor 11 may be referred to as the ambient temperature.

Assuming that the subject is coffee filled in a paper cup, the temperature sensor 11 may be used to sense the temperature of the paper cup, and the processor 12 may be used to calibrate the temperature of the paper cup into the temperature of the coffee. In another embodiment, the temperature sensor 11 may include two sensing elements, with one sensing element disposed at the top of/underneath the weighing surface 101 for generating the target temperature, and the other sensing element disposed at the surrounding of the weighing surface 101 for generating the ambient temperature. The processor 12 is configured to compensate the target temperature based on the ambient temperature generated by the temperature sensor 11. The processor 12 may be disposed internally to the scale 10, the processor 12 may be also disposed externally to the scale 10, such as disposed in a desktop computer, a tablet, a smart phone etc. The processor 12 may include one or more processors, the processor is, for example, a central processing unit, a graphics processing unit, a microcontroller, a programmable logic controller or any other processor with signal processing function.

Figure 2:
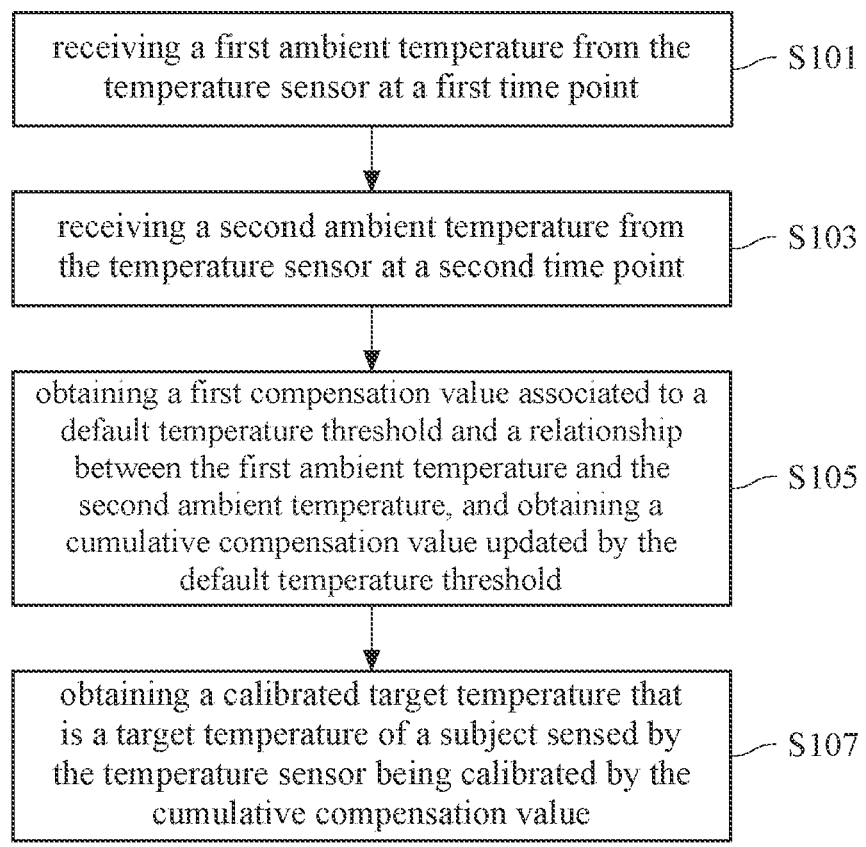
FIG. 2 is a flowchart illustrating a temperature compensation method for weighing device according to an embodiment of the present disclosure.

Please refer to FIG. 1(a), FIG. 1(b) and FIG. 2, wherein FIG. 2 is a flowchart illustrating a temperature compensation method for weighing device according to an embodiment of the present disclosure. The temperature compensation method for weighing device shown in FIG. 2 is adapted to the weighing device 1 of FIG. 1(a) and FIG. 1(b), and is performed by the processor 12 of the weighing device 1 when the scale 10 is powered on. The temperature compensation method for weighing device includes: step S101: receiving a first ambient temperature from the temperature sensor at a first time point; step S103: receiving a second ambient temperature from the temperature sensor at a second time point; step S105: obtaining a first compensation value associated to a default temperature threshold and a relationship between the first ambient temperature and the second ambient temperature, and obtaining a cumulative compensation value updated by the default temperature threshold; and step S107: obtaining a calibrated target temperature that is a target temperature of a subject sensed by the temperature sensor being calibrated by the cumulative compensation value, wherein the first time point of step S101 is earlier than the second time point of step S103.

In step S101, the processor 12 obtains the temperature sensed at the first time point from the temperature sensor 11 as the first ambient temperature. Then, in step S103, the processor 12 obtains the temperature sensed at the second time point from the temperature sensor 11 as the second ambient temperature. A time difference between the first time point and the second time point may be 0.5 second, but the present disclosure is not limited thereto.

In step S105, the processor 12 determines whether the ambient temperature increases according to the first ambient temperature and the second ambient temperature, and calculates the first compensation value according to the default temperature threshold. The default temperature threshold may be considered as the threshold value for determining that the ambient temperature has changed, and may be a value of a temperature resolution of the temperature sensor 11. In addition, in the embodiment of the temperature sensor 11 including two sensing elements described above, the default temperature threshold may be a value of a temperature resolution of the sensing element that is used to generate the ambient temperature. The processor 12 then adds the first compensation value to the cumulative compensation value to update the cumulative compensation value. The cumulative compensation value may be a sum of compensation values from past to present, and an initial value of the cumulative compensation value may be zero. When two ambient temperatures of consecutive two time points are the same, the processor 12 may set the first compensation value as zero, for the cumulative compensation value to be maintained at the same value.

In step S107, the processor 12 obtains a calibrated target temperature by using the cumulative compensation value to calibrate the target temperature of the subject sensed by the temperature sensor 11, wherein the measurement time point corresponding to the target temperature may be between (and include) the first time point and the second time point. For example, the processor 12 adds the cumulative compensation value to the target temperature of the subject to obtain the calibrated target temperature, thereby reducing or eliminating the impact of the accumulated heat on the weighing surface 101 of the scale 10 to the target temperature. In addition, the processor 12 may control a display screen of the scale 10 to display the calibrated target temperature, output the calibrated target temperature to another display screen connected to the processor 12 and/or output the calibrated target temperature to a terminal device of the user, etc.

Accordingly, even if the temperature of the weighing surface 101 itself increases or decreases because of contacting the subject, the target temperature that is close to the actual temperature of the subject may be generated by the compensation method of the above embodiment.

Figure 3:
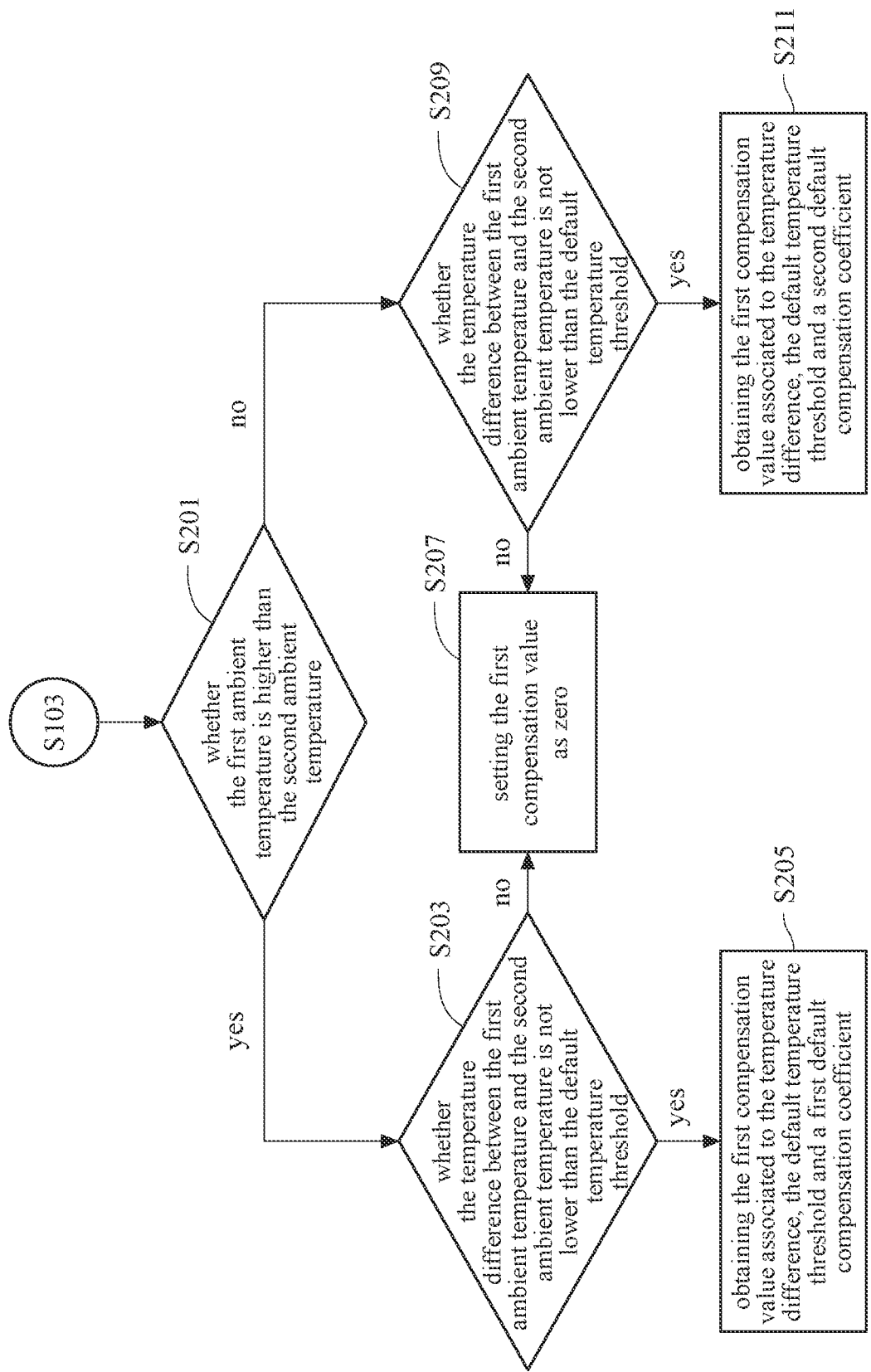
FIG. 3 is a flowchart illustrating a method of calculating compensation value according to an embodiment of the present disclosure.

Please refer to FIG. 1(*a*), FIG. 1(*b*) and FIG. 3, wherein FIG. 3 is a flowchart illustrating a method of calculating compensation value according to an embodiment of the present disclosure. FIG. 3 may be seen as a detail flowchart of an embodiment of step S105 of FIG. 2. As shown in FIG. 3, after obtaining the second ambient temperature (step S103 of FIG. 2), the temperature compensation method for weighing device may further include: step S201: determining whether the first ambient temperature is higher than the second ambient temperature; if the determination result of step S201 is "yes", performing step S203: determining whether the temperature difference between the first ambient temperature and the second ambient temperature is not lower than the default temperature threshold; if the determination result of step S203 is "yes", performing step S205: obtaining the first compensation value associated to the temperature difference, the default temperature threshold and a first default compensation coefficient; if the determination result of step S203 is "no", performing step S207: setting the first compensation value as zero; if the determination result of step S201 is "no", performing step S209: determining whether the temperature difference between the first ambient temperature and the second ambient temperature is not lower than the default temperature threshold; if the determination result of step S209 is "yes", performing step S211: obtaining the first compensation value associated to the temperature difference, the default temperature threshold and a second default compensation coefficient; and if the determination result of step S209 is "no", performing step S207.

In step S201, the processor 12 determines whether the first ambient temperature is higher than the second ambient temperature to determine whether the ambient temperature increases. If the processor 12 determines that the first ambient temperature is higher than the second ambient temperature, it means that the ambient temperature decreases. In step S203, the processor 12 further determines whether the temperature difference between the first ambient temperature and the second ambient temperature is not lower than the default temperature threshold.

If the processor 12 determines that the temperature difference is not lower than the default temperature threshold, in step S205, the processor 12 calculates the first compensation value according to the temperature difference, the default temperature threshold and the first default compensation coefficient, wherein the first default compensation coefficient is the compensation coefficient used when the ambient temperature decreases. Specifically, the temperature difference is obtained by subtracting the second ambient temperature from the first ambient temperature, and the method of obtaining the first compensation value includes: obtaining the quotient that is a value of the temperature difference divided by the default temperature threshold, and obtaining the first compensation value that is a value of an opposite number of the quotient multiplied with the first default compensation coefficient, as shown in equation (1) below:

$$T_{com1} = -\left[\frac{T'_A - T_A}{\vartheta}\right] \times \lambda_{cool\_down} \quad \text{equation (1)}$$

wherein $T_{com1}$ is the first compensation value; $T'_A$ is the first ambient temperature; $T_A$ is the second ambient temperature; $\delta$ is the default temperature threshold;

$$\left[\frac{T'_A - T_A}{\vartheta}\right]$$

is the Gaussian function (floor function) of the quotient obtained by dividing the temperature difference by the default temperature threshold; and $\lambda_{cool\_down}$ is the first default compensation coefficient.

On the contrary, if the processor 12 determines that the temperature difference is lower than the default temperature threshold, in step S207, the processor 12 may set the first compensation value as zero, and add zero to the cumulative compensation value to update the cumulative compensation value (i.e. the cumulative compensation value does not change).

Please refer to step S201 again, if the processor 12 determines that the first ambient temperature is not higher than the second ambient temperature, it may mean that the ambient temperature increases, and in step S209, the processor 12 further determines whether the temperature difference between the first ambient temperature and the second ambient temperature is not lower than the default temperature threshold, wherein the content of step S209 may be the same as the content of step S203.

If the processor 12 determines that the temperature difference is not lower than the default temperature threshold, in step S211, the processor 12 obtains the first compensation value according to the temperature difference, the default temperature threshold and the second default compensation coefficient, wherein the second default compensation coefficient is a compensation coefficient used when the ambient temperature increases. Specifically, the temperature difference is obtained by subtracting the first ambient temperature from the second ambient temperature, and the method of obtaining the first compensation value includes: obtaining the quotient that is a value of the temperature difference divided by the default temperature threshold, and obtaining the first compensation value that is a value of the quotient multiplied with the second default compensation coefficient, as shown in equation (2) below:

$$T_{com1} = \left[\frac{T_A - T'_A}{\vartheta}\right] \times \lambda_{heat\_up} \quad \text{equation (2)}$$

wherein $T_{com1}$ is the first compensation value; $T_A$ is the first ambient temperature; $T'_A$ is the second ambient temperature; $\delta$ is the default temperature threshold;

$$\left[\frac{T_A - T'_A}{\vartheta}\right]$$

is the Gaussian function (floor function) of the quotient obtained by dividing the temperature difference by the default temperature threshold; and $\lambda_{heat\_up}$ is the second default compensation coefficient.

On the contrary, if the processor 12 determines that the temperature difference is lower than the default temperature threshold, the processor 12 performs step S207 wherein the first compensation value is set as zero.

In short, if in step S201, the processor 12 determines that the first ambient temperature is higher than the second ambient temperature (the determination result of step S201 is "yes"), the processor 12 may set the first compensation value according to the following rule:

$$T_{com1} = \begin{cases} \left[\frac{T'_A - T_A}{\vartheta}\right] \times \lambda_{cool\_down}, & T'_A - T_A \geq \vartheta \\ 0, & T'_A - T_A < \vartheta \end{cases}$$

If in step S201, the processor 12 determines that the first ambient temperature is not higher than the second ambient temperature (the determination result of step S201 is "no"), the processor 12 may set the first compensation value according to the following rule:

$$T_{com1} = \begin{cases} \left[\frac{T_A - T'_A}{\vartheta}\right] \times \lambda_{heat\_up}, & T_A - T'_A \geq \vartheta \\ 0, & T_A - T'_A < \vartheta \end{cases}$$

Figure 4A:
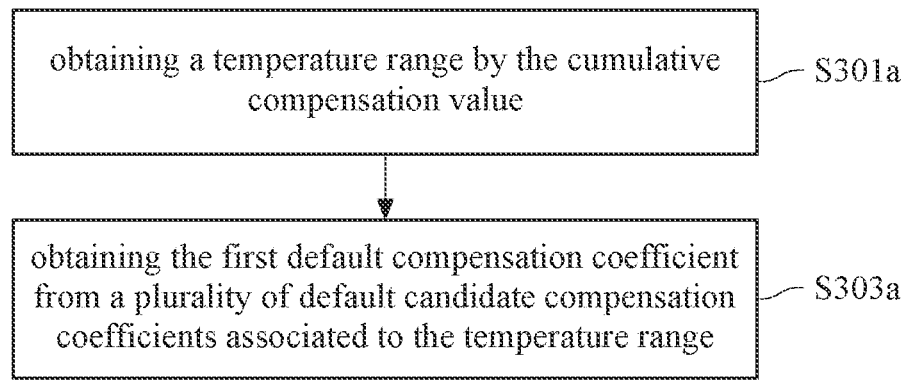
FIG. 4(a) is a flowchart illustrating a method of obtaining a first default compensation coefficient according to an embodiment of the present disclosure.

Please refer to FIG. 1(a), FIG. 1(b) and FIG. 4(a), wherein FIG. 4(a) is a flowchart illustrating a method of obtaining a first default compensation coefficient according to an embodiment of the present disclosure. Steps shown in FIG. 4(a) may be performed when the first ambient temperature is higher than the second ambient temperature and the temperature difference between the first ambient temperature and the second ambient temperature is not lower than the default temperature threshold, and may be performed between step S203 and step S205 of FIG. 3. As shown in FIG. 4(a), the temperature compensation method for weighing device may further include: step S301a: obtaining a temperature range by the cumulative compensation value; and step S303a: obtaining the first default compensation coefficient from a plurality of default candidate compensation coefficients associated to the temperature range.

Specifically, the processor 12 may store the compensation coefficient tables as shown in table 1 and table 2 below, and table 1 and table 2 are adapted for when the first ambient temperature is higher than the second ambient temperature and the temperature difference between the first ambient temperature and the second ambient temperature is not lower than the default temperature threshold. As shown in table 1 and table 2, the temperature ranges correspond to the cumulative compensation values ($T_{compensate}$) and further correspond to different default candidate compensation coefficients ($\lambda_{cool\_down,A}$), wherein table 1 corresponds to a situation where the subject is loaded into a paper-made container (for example, a paper cup), and table 2 corresponds to a situation where the subject is loaded into a glass-made container (for example, a glass cup).

TABLE 1

| | cooling compensation coefficient | |
|---|---|---|
| state 1 | 0° C. < $T_{compensate}$ < 2° C. | $\lambda_{cool\_down, A}$ = 0.05 |
| state 2 | 2° C. < $T_{compensate}$ < 4° C. | $\lambda_{cool\_down, A}$ = 0.125 |
| state 3 | 4° C. < $T_{compensate}$ < 6° C. | $\lambda_{cool\_down, A}$ = 0.25 |

TABLE 2

| | cooling compensation coefficient | |
|---|---|---|
| state 1 | 0° C. < $T_{compensate}$ < 5.5° C. | $\lambda_{cool\_down, A}$ = 0.085 |
| state 2 | 5.5° C. < $T_{compensate}$ < 15° C. | $\lambda_{cool\_down, A}$ = 0.5 |

In step S301a and step S303a, the processor 12 may determine the temperature range that the cumulative compensation value ($T_{compensate}$) corresponds to, and use the default candidate compensation coefficient ($\lambda_{cool\_down,A}$) that the temperature range corresponds to as the first default compensation coefficient ($\lambda_{cool\_down}$), wherein the cumulative compensation value ($T_{compensate}$) is the cumulative compensation value updated based on the embodiment of step S105 in FIG. 2 or FIG. 3.

Figure 4B:
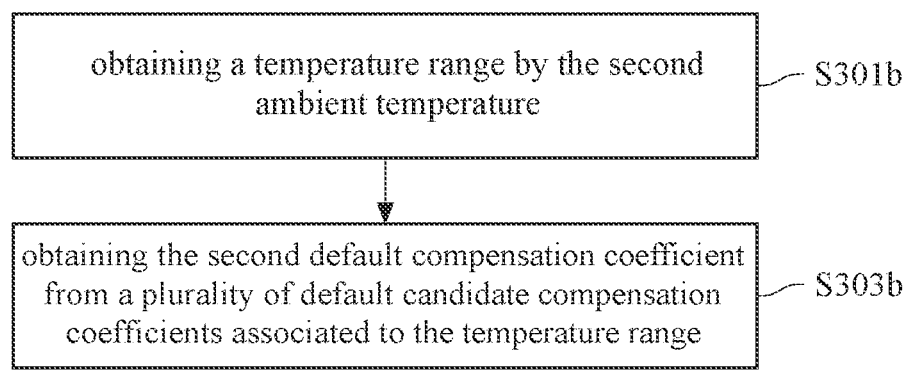
FIG. 4(b) is a flowchart illustrating a method of obtaining a second default compensation coefficient according to an embodiment of the present disclosure.

Please refer to FIG. 1(a), FIG. 1(b) and FIG. 4(b), wherein FIG. 4(b) is a flowchart illustrating a method of obtaining a second default compensation coefficient according to an embodiment of the present disclosure. Steps shown in FIG. 4(b) may be performed when the first ambient temperature is not higher than the second ambient temperature and the temperature difference between the first ambient temperature and the second ambient temperature is not lower than the default temperature threshold, and may be performed between step S209 and step S211 of FIG. 3. As shown in FIG. 4(b), the temperature compensation method for weighing device may further include: step S301b: obtaining a temperature range by the second ambient temperature; and step S303b: obtaining the second default compensation coefficient from a plurality of default candidate compensation coefficients associated to the temperature range.

Specifically, the processor 12 may store the compensation coefficient tables as shown in table 3 and table 4 below, and table 3 and table 4 are adapted for when the first ambient temperature is not higher than the second ambient temperature and the temperature difference between the first ambient temperature and the second ambient temperature is not lower than the default temperature threshold. As shown in table 3 and table 4, the temperature ranges correspond to the second ambient temperatures ($T_A$) and further correspond to different default candidate compensation coefficients ($\lambda_{heat\_up,A}$), wherein table 3 corresponds to a situation where the subject is loaded into a paper-made container (for example, a paper cup), and table 4 corresponds to a situation where the subject is loaded into a glass-made container (for example, a glass cup).

TABLE 3

| | non-cooling compensation coefficient | |
|---|---|---|
| state 1 | $T_A < 26°$ C. | $\lambda_{heat\_up, A} = 0.11$ |
| state 2 | $26°$ C. $< T_A < 28°$ C. | $\lambda_{heat\_up, A} = 0.115$ |
| state 3 | $T_A > 28°$ C. | $\lambda_{heat\_up, A} = 0.12$ |

TABLE 4

| | non-cooling compensation coefficient | |
|---|---|---|
| state 1 | $0°$ C. $< T_{compensate} < 5.5°$ C. | $\lambda_{heat\_up, A} = 0.2$ |
| state 2 | $5.5°$ C. $< T_{compensate} < 15°$ C. | $\lambda_{heat\_up, A} = 0.05$ |

In step S301b and step S303b, the processor 12 may determine the temperature range that the second ambient temperature ($T_A$) corresponds to, and use the default candidate compensation coefficient ($\lambda_{heat\_up,A}$) that the temperature range corresponds to as the second default compensation coefficient ($\lambda_{heat\_up}$).

Figure 5:
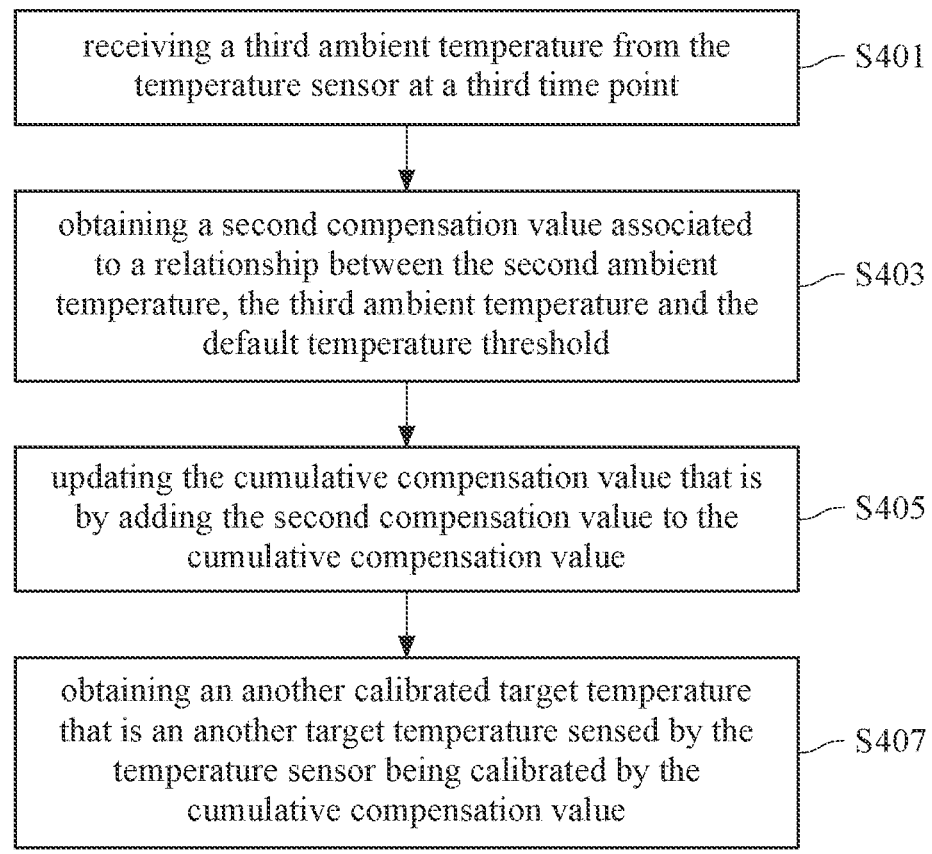
FIG. 5 is a flowchart illustrating a temperature compensation method for weighing device according to another embodiment of the present disclosure.

Please refer to FIG. 1(a), FIG. 1(b) and FIG. 5, wherein FIG. 5 is a flowchart illustrating a temperature compensation method for weighing device according to another embodiment of the present disclosure. The temperature compensation method for weighing device shown in FIG. 5 is adapted to the weighing device 1 of FIG. 1(a) and FIG. 1(b), and may be performed after step S107 of FIG. 2. As shown in FIG. 5, the temperature compensation method for weighing device may further include: step S401: receiving a third ambient temperature from the temperature sensor at a third time point; step S403: obtaining a second compensation value associated to the default temperature threshold and a relationship between the second ambient temperature and the third ambient temperature; step S405: updating the cumulative compensation value by adding the second compensation value to the cumulative compensation value; and step S407: obtaining an another calibrated target temperature that is an another target temperature sensed by the temperature sensor being calibrated by the cumulative compensation value.

Steps S401, S403, S405 and S407 shown in FIG. 5 are similar to steps S101, S103, S105 and S107 shown in FIG. 2, respectively, and the steps in FIG. 5 are performed based on the third ambient temperature obtained by the temperature sensor 11 at the third time point, their detail descriptions are not repeated herein. Specifically, the first time point and the second time point are separated by a default time interval, and the third time point is later than the second time point by the default time interval. Take the 0.5 second described above for example, the second time point is later than the first time point by 0.5 second, and the third time point is later than the second time point by 0.5 second.

Further, the processor 12 may perform steps shown in FIG. 3 on the second ambient temperature and the third ambient temperature; apply the rule of setting the first compensation value according to step S105 of FIG. 2 or the embodiment of FIG. 3 on the second ambient temperature and the third ambient temperature to set the second compensation value; and perform steps shown in FIG. 4(a) or FIG. 4(b) based on the cumulative compensation value updated in step S405 to obtain the second default compensation coefficient.

Figure 6:
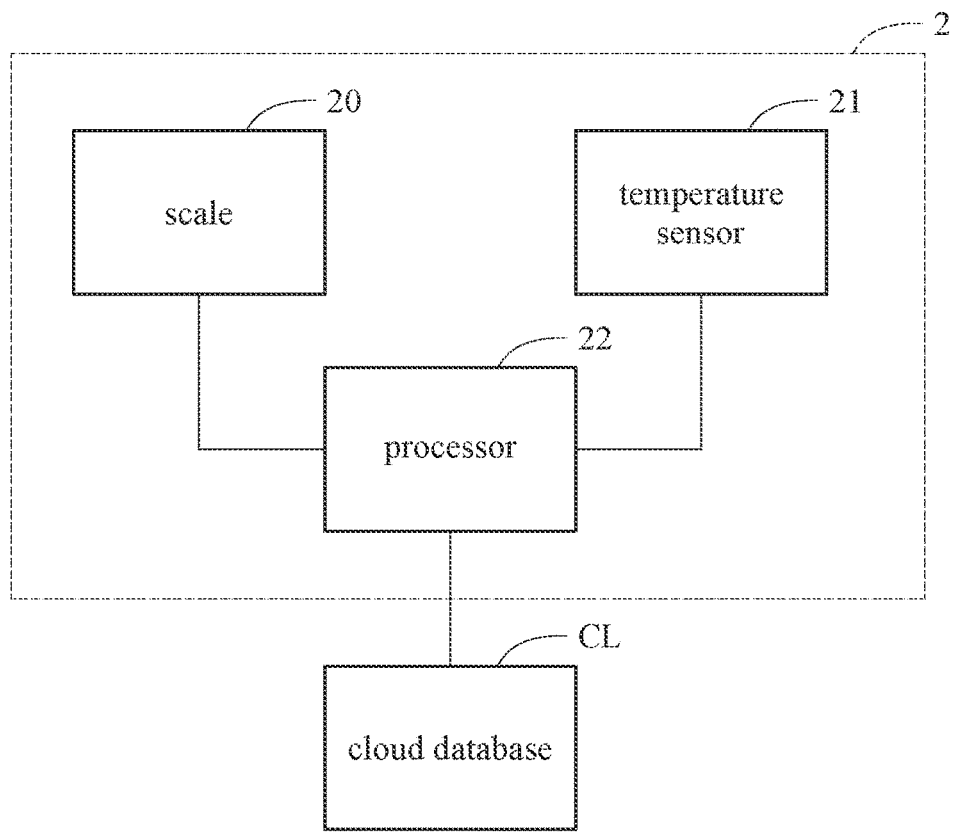
FIG. 6 is a block diagram illustrating a weighing device with temperature sensing function according to another embodiment of the present disclosure.

Please refer to FIG. 6, wherein FIG. 6 is a block diagram illustrating a weighing device with temperature sensing function according to another embodiment of the present disclosure. The weighing device 2 includes a scale 20, a temperature sensor 21 and a processor 22. The processor 22 may be connected to the scale 20 and the temperature sensor 21 in a wired or wireless way. The implementation of the scale 20, the temperature sensor 21 and the processor 22 may be the same as the scale 10, the temperature sensor 11 and the processor 12 of FIG. 1, and their detail descriptions are not repeated herein.

In this embodiment, the processor 22 is further connected to a cloud database CL in a wireless way. A plurality of cooling compensation coefficient tables and a plurality of non-cooling compensation coefficient tables corresponding to a plurality of subject categories respectively are stored in the cloud database CL. A plurality of temperature ranges and a plurality of default candidate compensation coefficients corresponding to the plurality of temperature ranges are recorded in each of the plurality of cooling compensation coefficient tables and the non-cooling compensation coefficient tables. One subject category may correspond to one cooling compensation coefficient table and one non-cooling compensation coefficient table. The cooling compensation coefficient tables may be tables such as table 1/table 2, and the non-cooling compensation coefficient tables may be tables such as table 3/table 4. In other words, one cooling compensation coefficient table may include a plurality of temperature ranges and the corresponding default candidate compensation coefficients of the cooling state; and one non-cooling compensation coefficient table may include a plurality of temperature ranges and the corresponding default candidate compensation coefficients of the non-cooling state.

Figure 7:
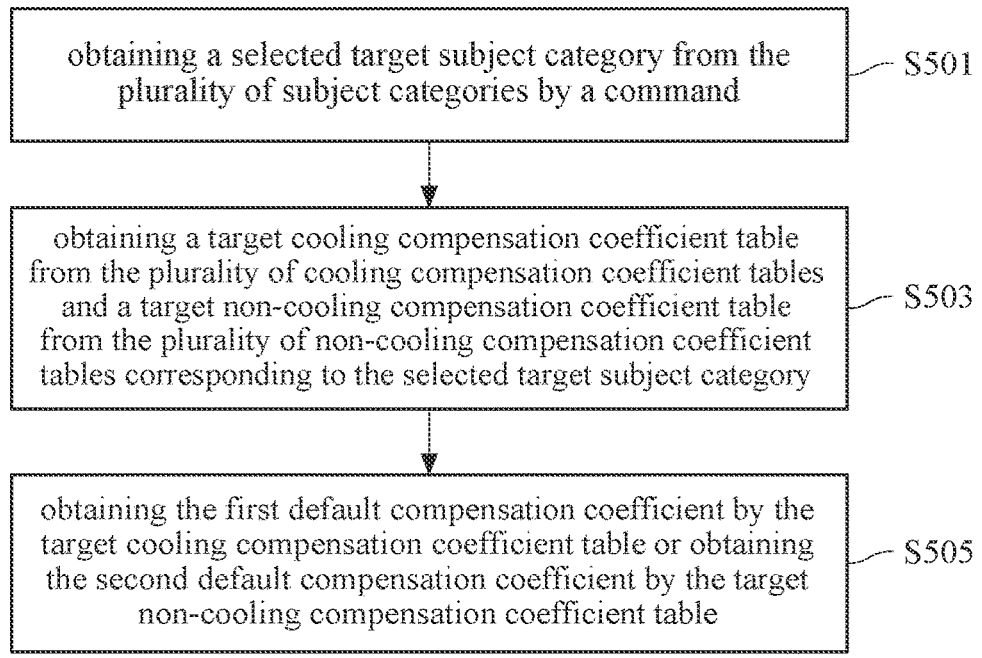
FIG. 7 is a flowchart illustrating a method of determining a default compensation coefficient according to a subject category according to an embodiment of the present disclosure.

Please refer to FIG. 6 and FIG. 7, wherein FIG. 7 is a flowchart illustrating a method of determining a default compensation coefficient according to a subject category according to an embodiment of the present disclosure. The processor 22 may perform steps shown in FIG. 7 to obtain the first/second default compensation coefficient described in step S205 or S211 of FIG. 3 and FIG. 4(a) and FIG. 4(b). As shown in FIG. 7, the method of determining the default candidate compensation coefficient includes: step S501: obtaining a selected target subject category from the plurality of subject categories by a command; step S503: obtaining a target cooling compensation coefficient table from the plurality of cooling compensation coefficient tables and a target non-cooling compensation coefficient table from the plurality of non-cooling compensation coefficient tables corresponding to the selected target subject category; and step S505: obtaining the first default compensation coefficient by the target cooling compensation coefficient table or obtaining the second default compensation coefficient by the target non-cooling compensation coefficient table.

In step S501, the processor 22 may obtain the command from a user interface, wherein the command specifies the target subject category, and the processor 22 selects the target subject category that is specified as the selected target subject category. The user interface may be a keyboard, a mouse, a microphone or a touch screen etc. that is electrically connected to or in communication connection with the processor 22, the present disclosure is not limited thereto. The subject categories may include a paper-made container, a glass container, a ceramic container, a plastic container and a metal container etc. as described above.

In step S503, the processor 22 may select the target cooling compensation coefficient table and the target non-cooling compensation coefficient table according to the candidate compensation coefficient tables according to the selected target subject category. For example, assuming that the selected target subject category is the paper-made container, the processor 22 selects the target cooling compensation coefficient table as shown in table 1 and the target non-cooling compensation coefficient table as shown in table 3 from the candidate compensation coefficient tables (table 1 to table 4)

In step S505, the processor 22 may obtain the first default compensation coefficient from the target cooling compensation coefficient table according to the temperature difference, or obtain the second default compensation coefficient from the target non-cooling compensation coefficient table. Further, when the first ambient temperature is higher than the second ambient temperature and the temperature difference between the first ambient temperature and the second ambient temperature is not lower than the default temperature threshold, the processor 22 obtains the first default compensation coefficient from the target cooling compensation coefficient table; and when the first ambient temperature is not higher than the second ambient temperature and the temperature difference between the first ambient temperature and the second ambient temperature is not lower than the default temperature threshold, the processor 22 obtains the second default compensation from the target non-cooling compensation coefficient table.

On the other hand, if the command specifies an update to the cooling compensation coefficient tables and/or the non-cooling compensation coefficient tables, the processor 22 may update at least one default candidate compensation coefficient of the cooling compensation coefficient tables and/or the non-cooling compensation coefficient tables according to the command. For example, the command may specify an update to the default candidate compensation coefficient ($\lambda_{cool\_down\_A}$) corresponding to the temperature range of 0° C. to 2° C. in the cooling compensation coefficient table (table 1) where the subject is the paper-made container, the present disclosure is not limited thereto.

Please refer to FIG. 8(a), FIG. 8(b) and FIG. 8(c), wherein FIG. 8(a) is a graph showing the change of actual temperature and measured temperature without compensation mechanism in the first scenario; FIG. 8(b) is a graph showing the change of actual temperature and the compensated water temperature (the calibrated target temperature) using the temperature compensation method of the present disclosure in the first scenario; and FIG. 8(c) is a comparison graph showing the errors of FIG. 8(a) and FIG. 8(b). The subject is 450 g of 80° C. hot water filled in a paper cup, and the first scenario is that this cup of hot water is placed on the weighing surface of the scale for 5 minutes. The measured temperature is the temperature measured by the temperature sensor of the scale, the actual temperature is the temperature obtained by another temperature sensor by directly measuring the temperature of this cup of hot water.

In FIG. 8(a), when there is no compensation mechanism, as time passes, since the thermal energy of the hot water is transferred to the weighing surface of the scale, the difference between the actual temperature and the measured temperature gradually increases, and the measured temperature is significantly higher than the actual temperature. In FIG. 8(b), even though the thermal energy of the hot water is also transferred to the weighing surface of the scale, through one or more embodiments of the present disclosure, the measured temperature and the actual temperature are close to each other. As seen from FIG. 8(c), the error of using the compensation mechanism is significantly lower than the error of not using compensation mechanism, and that the error of using the compensation mechanism is maintained within plus or minus two degrees.

Please refer to FIG. 9(a), FIG. 9(b) and FIG. 9(c), wherein FIG. 9(a) is a graph showing the change of actual temperature and measured temperature without compensation mechanism in the second scenario; FIG. 9(b) is a graph showing the change of actual temperature and the compensated water temperature (the calibrated target temperature) using the temperature compensation method of the present disclosure in the second scenario; FIG. 9(c) is a comparison graph showing the errors of FIG. 9(a) and FIG. 9(b). The subject is 450 g of 80° C. hot water filled in a paper cup, and the second scenario is that this cup of hot water is placed on the weighing surface of the scale for 30 seconds, then removed from the weighing surface for 30 seconds, and then placed back on the weighing surface for 30 seconds, and so on. The measured temperature is the temperature measured by the temperature sensor of the scale, the actual temperature is the temperature obtained by another temperature sensor by directly measuring the temperature of this cup of hot water.

In FIG. 9(a), when there is no compensation mechanism, since the thermal energy of the hot water is transferred to the weighing surface of the scale, when the subject is placed on the weighing surface of the scale, the error between the actual temperature and the measured temperature increases, and the measured temperature is higher than the actual temperature. In FIG. 9(b), even though the thermal energy of the hot water is also transferred to the weighing surface of the scale, through one or more embodiments of the present disclosure, the measured temperature and the actual temperature are close to each other. As seen from FIG. 9(c), the error of using the compensation mechanism is significantly lower than the error of not using compensation mechanism, and that the error of using the compensation mechanism is maintained within plus or minus two degrees.

Please refer to FIG. 10(a), FIG. 10(b) and FIG. 10(c), wherein FIG. 10(a) is a graph showing the change of actual temperature and measured temperature without compensation mechanism in the third scenario; FIG. 10(b) is a graph showing the change of actual temperature and the compensated water temperature (the calibrated target temperature) using the temperature compensation method of the present disclosure in the third scenario; FIG. 10(c) is a comparison graph showing the errors of FIG. 10(a) and FIG. 10(b). The subject is 450 g of 80° C. hot water filled in a paper cup, and the third scenario is that this cup of hot water is placed on the weighing surface of the scale for 60 seconds, then removed from the weighing surface for 30 seconds, and then placed back on the weighing surface for 60 seconds, and so on. The measured temperature is the temperature measured by the temperature sensor of the scale, the actual temperature is the temperature obtained by another temperature sensor by directly measuring the temperature of this cup of hot water.

In FIG. 10(a), when there is no compensation mechanism, since the thermal energy of the hot water is transferred to the weighing surface of the scale, when the subject is placed on the weighing surface of the scale, the error between the actual temperature and the measured temperature increases, and the measured temperature is higher than the actual temperature. In FIG. 10(b), even though the thermal energy of the hot water is also transferred to the weighing surface of the scale, through one or more embodiments of the present disclosure, the measured temperature and the actual temperature are close to each other. As seen from FIG. 10(c), the error of using the compensation mechanism is significantly lower than the error of not using compensation mechanism, and that the error of using the compensation mechanism is maintained within plus or minus two degrees.

As seen from the experiment results shown in FIG. 8(a), FIG. 8(b) and FIG. 8(c); FIG. 9(a), FIG. 9(b) and FIG. 9(c) and FIG. 10(a), FIG. 10(b) and FIG. 10(c), the compensation mechanism of the present disclosure may significantly alleviate the problem of heat storage/heat dissipation. Especially in the second scenario and the third scenario, comparing to the experiment of no compensation mechanism, the compensation mechanism of the present disclosure shows that the temperature error can be reduced by up to 500%.

In addition to the result of the paper cup, similar result may be obtained by applying the weighing device and temperature compensation method thereof of the present disclosure to glass cup filled with water with different temperatures, as shown in table 5 and table 6 below.

In the experiment of table 5, the glass cup is filled with 82.3° C. of hot water, and the cup is removed from the weighing surface when the actual temperature is at 75.6° C. As shown in table 5, the temperature errors between the compensated water temperatures and the actual temperatures are not higher than 2° C.

TABLE 5

(unit: ° C.)
82.3 degrees of hot water

| placed | | | removed | | |
|---|---|---|---|---|---|
| actual temperature | compensated water temperature | temperature error | actual temperature | compensated water temperature | temperature error |
| 82.3 | 82.1 | −0.2 | 75.2 | 73.2 | −2 |
| 81.9 | 81.5 | −0.4 | 74.7 | 73.4 | −1.3 |
| 80.8 | 80 | −0.8 | 74 | 73.2 | −0.8 |
| 79.7 | 79.2 | −0.5 | 73.2 | 73.1 | −0.1 |
| 79 | 77.9 | −1.1 | 72.3 | 72.4 | 0.1 |
| 78 | 76.5 | −1.5 | 71.1 | 72.5 | 1.4 |
| 77 | 75.6 | −1.4 | 70.4 | 71.5 | 1.1 |
| 76.2 | 75 | −1.2 | | | |
| 75.6 | 74.7 | −0.9 | | | |

In the experiment of table 6, the glass cup is filled with 76.1° C. of hot water, and the cup is placed on the weighing surface of the scale for 30 seconds (the hot water is placed on the weighing surface for consecutive 30 seconds), removed from the weighing surface of the scale for 30 seconds (no water is placed on the weighing surface for 30 seconds), and then is placed back on the weighing surface of the scale for 30 seconds, and so on. As shown in table 6, the temperature errors between the compensated water temperatures and the actual temperatures are not higher than 2° C.°

TABLE 6

(unit: ° C.)
79.9 degrees of hot water

| | actual temperature | compensated water temperature | temperature error |
|---|---|---|---|
| placed | 76.1 | 74.2 | −1.9 |
| removed | 73.7 | 71.7 | −2 |
| placed | 72.5 | 72.9 | 0.4 |
| removed | 71.6 | 70.5 | −1.1 |
| placed | 70.4 | 70.4 | 0 |
| removed | 69.1 | 68.2 | −0.9 |
| placed | 67.8 | 67.7 | −0.1 |
| removed | 66.3 | 65.6 | −0.7 |
| placed | 65.8 | 65.1 | −0.7 |

TABLE 6-continued (unit: ° C.)
79.9 degrees of hot water

| | actual temperature | compensated water temperature | temperature error |
|---|---|---|---|
| removed | 64.4 | 62.6 | −1.8 |

The weighing device and temperature compensation method thereof according to one or more embodiments of the present disclosure may be applied to coffee maker, to make sure the temperature and the weight of the coffee produced by the coffee maker are within standards; to detect water temperature and water volume at each stage of making pour over coffee; to detect weight and temperature of materials at each stage of dessert (eg, cake) making; to detect weight and temperature of food cooked at low temperature (eg, sous vide meat); to detect weight and temperature of beverages (for example, hot chocolate, making milk with milk powder and tea, etc.); and to detect weight and temperature of each stage of alcohol brewing (for example, to confirm whether the temperature is constant), etc.

In view of the above description, the weighing device and temperature compensation method thereof according to one or more embodiments of the present disclosure may be applied to determine temperature variation of the ambient temperature through the temperature sensor and to compensate the target temperature, thereby significantly alleviating the problem of temperature error between the temperature measured by the temperature sensor and the actual temperature of the subject caused by heat storage/heat dissipation, and the temperature error is maintained within plus or minus two degrees. Accordingly, even if the temperature of the weighing surface itself increases or decreases because of contacting the subject, the target temperature that is close to the actual temperature of the subject may be generated by the compensation method of the above one or more embodiment.

What is claimed is:

1. A temperature compensation method for a weighing device, wherein the weighing device comprises a scale, a temperature sensor and a processor, the temperature sensor is positioned on a weighing surface of the scale or positioned within the scale, the processor is disposed internally or externally to the scale, and the method is performed by the processor and comprises:

receiving a first ambient temperature from the temperature sensor at a first time point;

receiving a second ambient temperature from the temperature sensor at a second time point;

obtaining a first compensation value associated to a default temperature threshold and a relationship between the first ambient temperature and the second ambient temperature, and obtaining a cumulative compensation value updated by the default temperature threshold; and obtaining a calibrated target temperature that is a target temperature of a subject sensed by the temperature sensor being calibrated by the cumulative compensation value;

wherein the first time point is earlier than the second time point.

2. The temperature compensation method for weighing device according to claim 1, wherein obtaining the first compensation value associated to the default temperature threshold and the relationship between the first ambient temperature and the second ambient temperature comprises:

when the first ambient temperature is higher than the second ambient temperature, and a temperature difference between the first ambient temperature and the second ambient temperature is not lower than the default temperature threshold, obtaining the first compensation value associated to the temperature difference, the default temperature threshold and a first default compensation coefficient; and when the first ambient temperature is not higher than the second ambient temperature and the temperature difference between the first ambient temperature and the second ambient temperature is not lower than the default temperature threshold, obtaining the first compensation value associated to the temperature difference, the default temperature threshold and a second default compensation coefficient.

3. The temperature compensation method for weighing device according to claim 2, further comprising, when the first ambient temperature is higher than the second ambient temperature and the temperature difference between the first ambient temperature and the second ambient temperature is not lower than the default temperature threshold:

obtaining a temperature range by the cumulative compensation value; and obtaining the first default compensation coefficient from a plurality of default candidate compensation coefficients associated to the temperature range.

4. The temperature compensation method for weighing device according to claim 2, further comprising, when the first ambient temperature is not higher than the second ambient temperature and the temperature difference between the first ambient temperature and the second ambient temperature is not lower than the default temperature threshold:

obtaining a temperature range by the second ambient temperature; and obtaining the second default compensation coefficient from a plurality of default candidate compensation coefficients associated to the temperature range.

5. The temperature compensation method for weighing device according to claim 2, wherein the temperature difference is obtained by subtracting the second ambient temperature from the first ambient temperature, and obtaining the first compensation value associated to the temperature difference, the default temperature threshold and the first default compensation coefficient comprises:

obtaining a quotient that is by the temperature difference divided by the default temperature threshold; and obtaining the first compensation value that is an opposite number of the quotient multiplied by the first default compensation coefficient.

6. The temperature compensation method for weighing device according to claim 2, wherein the temperature difference is obtained by subtracting the first ambient temperature from the second ambient temperature, and obtaining the first compensation value associated to the temperature difference, the default temperature threshold and the second default compensation coefficient comprises:

obtaining a quotient that is the temperature difference divided by the default temperature threshold; and obtaining the first compensation value that is the quotient multiplied by the second default compensation coefficient.

7. The temperature compensation method for weighing device according to claim 1, wherein the first time point and the second time point are separated by a default time interval, and the method further comprising:

receiving a third ambient temperature from the temperature sensor at a third time point;

obtaining a second compensation value associated to the default temperature threshold and a relationship between the second ambient temperature and the third ambient temperature;

updating the cumulative compensation value that is by adding the second compensation value to the cumulative compensation value; and obtaining an another calibrated target temperature that is an another target temperature sensed by the temperature sensor being calibrated by the cumulative compensation value;

wherein the third time point is later than the second time point by the default time interval.

8. The temperature compensation method for weighing device according to claim 1, further comprising:

when a temperature difference between the first ambient temperature and the second ambient temperature is lower than the default temperature threshold, the first compensation value is set as zero.

9. The temperature compensation method for weighing device according to claim 1, wherein the default temperature threshold is associated with a value a temperature resolution of the temperature sensor.

10. The temperature compensation method for weighing device according to claim 2, wherein the processor is connected to a cloud database, and a plurality of cooling compensation coefficient tables and a plurality of non-cooling compensation coefficient tables corresponding to a plurality of subject categories are stored in the cloud database, a plurality of temperature ranges and a plurality of default candidate compensation coefficients corresponding to the plurality of temperature ranges are recorded in each of the plurality of cooling compensation coefficient tables and the non-cooling compensation coefficient tables, and the method further comprises:

updating a default candidate compensation coefficient of one of the plurality of cooling compensation coefficient tables and the plurality of non-cooling compensation coefficient tables by a command, or obtaining a selected target subject category from the plurality of subject categories by the command;

obtaining a target cooling compensation coefficient table from the plurality of cooling compensation coefficient tables and a target non-cooling compensation coefficient table from the plurality of non-cooling compensation coefficient tables corresponding to the selected target subject category; and obtaining the first default compensation coefficient by the target cooling compensation coefficient table or obtaining the second default compensation coefficient by the target non-cooling compensation coefficient table.

11. A weighing device with temperature sensing function, comprising:
a scale having a weighing surface, and a subject being carried by the scale selectively;
a temperature sensor positioned on the weighing surface of the scale or positioned within the scale and located at a surrounding of a position, and the subject being sensed by the temperature sensor selectively; and
a processor connected to the scale and the temperature sensor and disposed internally or externally to the scale, wherein when the scale is powered on, the processor performs:
receiving a first ambient temperature from the temperature sensor at a first time point;
receiving a second ambient temperature from the temperature sensor at a second time point;
obtaining a first compensation value associated to a default temperature threshold and a relationship between the first ambient temperature and the second ambient temperature, and obtaining a cumulative compensation value updated by the default temperature threshold; and
obtaining a calibrated target temperature that is a target temperature of a subject sensed by the temperature sensor being calibrated by the cumulative compensation value;
wherein the first time point is earlier than the second time point.

12. The weighing device with temperature sensing function according to claim 11, wherein the processor performing obtaining the first compensation value associated to the default temperature threshold and the relationship between the first ambient temperature and the second ambient temperature comprises:
when the first ambient temperature is higher than the second ambient temperature and a temperature difference between the first ambient temperature and the second ambient temperature is not lower than the default temperature threshold, obtaining the first compensation value associated to the temperature difference, the default temperature threshold and a first default compensation coefficient; and
when the first ambient temperature is not higher than the second ambient temperature and the temperature difference between the first ambient temperature and the second ambient temperature is not lower than the default temperature threshold, obtaining the first compensation value associated to the temperature difference, the default temperature threshold and a second default compensation coefficient.

13. The weighing device with temperature sensing function according to claim 12, wherein when the first ambient temperature is higher than the second ambient temperature and the temperature difference between the first ambient temperature and the second ambient temperature is not lower than the default temperature threshold, the processor further performs:
obtaining a temperature range by the cumulative compensation value; and obtaining the first default compensation coefficient from a plurality of default candidate compensation coefficients associated to the temperature range.

14. The weighing device with temperature sensing function according to claim 12, wherein when the first ambient temperature is not higher than the second ambient temperature and the temperature difference between the first ambient temperature and the second ambient temperature is not lower than the default temperature threshold, the processor further performs:
obtaining a temperature range by the second ambient temperature; and
obtaining the second default compensation coefficient from a plurality of default candidate compensation coefficients associated to the temperature range.

15. The weighing device with temperature sensing function according to claim 12, wherein the temperature difference is obtained by subtracting the second ambient temperature from the first ambient temperature, and the processor performing obtaining the first compensation value associated to the temperature difference, the default temperature threshold and the first default compensation coefficient comprises:
obtaining a quotient that is by the temperature difference divided by the default temperature threshold; and
obtaining the first compensation value that is an opposite number of the quotient multiplied by the first default compensation coefficient.

16. The weighing device with temperature sensing function according to claim 12, wherein the temperature difference is obtained by subtracting the first ambient temperature from the second ambient temperature, and the processor performing obtaining the first compensation value associated to the temperature difference, the default temperature threshold and the second default compensation coefficient comprises:
obtaining a quotient that is the temperature difference divided by the default temperature threshold; and
obtaining the first compensation value that is the quotient multiplied by the second default compensation coefficient.

17. The weighing device with temperature sensing function according to claim 11, wherein the first time point and the second time point are separated by a default time interval, and the processor further performs:
receiving a third ambient temperature from the temperature sensor at a third time point;
obtaining a second compensation value associated to the default temperature threshold and a relationship between the second ambient temperature and the third ambient temperature;
updating the cumulative compensation value by adding the second compensation value to the cumulative compensation value; and
obtaining an another calibrated target temperature that is an another target temperature sensed by the temperature sensor being calibrated by the cumulative compensation value;
wherein the third time point is later than the second time point by the default time interval.

18. The weighing device with temperature sensing function according to claim 11, wherein the processor further performs:
when a temperature difference between the first ambient temperature and the second ambient temperature is lower than the default temperature threshold, the first compensation value is set as zero.

19. The weighing device with temperature sensing function according to claim 11, wherein the default temperature threshold is associated with a value of a temperature resolution of the temperature sensor.

20. The weighing device with temperature sensing function according to claim 12, wherein the processor is further connected to a cloud database, and a plurality of cooling compensation coefficient tables and a plurality of non-cooling compensation coefficient tables corresponding to a plurality of subject categories are stored in the cloud database, a plurality of temperature ranges and a plurality of default candidate compensation coefficients corresponding to the plurality of temperature ranges are recorded in each of the plurality of cooling compensation coefficient tables and the non-cooling compensation coefficient tables, and the processor further performs:

updating a default candidate compensation coefficient of one of the plurality of cooling compensation coefficient tables and the plurality of non-cooling compensation coefficient tables by a command, or obtaining a selected target subject category from the plurality of subject categories by the command;

obtaining a target cooling compensation coefficient table from the plurality of cooling compensation coefficient tables and a target non-cooling compensation coefficient table from the plurality of non-cooling compensation coefficient tables corresponding to the selected target subject category; and obtaining the first default compensation coefficient by the target cooling compensation coefficient table or obtaining the second default compensation coefficient by the target non-cooling compensation coefficient table.

* * * * *